(12) United States Patent
Tamp

(10) Patent No.: US 10,068,390 B2
(45) Date of Patent: *Sep. 4, 2018

(54) METHOD FOR OBTAINING PRODUCT FEEDBACK FROM DRIVERS IN A NON-DISTRACTING MANNER

(71) Applicant: Google LLC, Mountain View, CA (US)

(72) Inventor: Fabian Tamp, Stanmore (AU)

(73) Assignee: Google LLC, Mountain View, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/140,568

(22) Filed: Apr. 28, 2016

(65) Prior Publication Data

US 2016/0240019 A1 Aug. 18, 2016

Related U.S. Application Data

(63) Continuation of application No. 14/312,832, filed on Jun. 24, 2014, now Pat. No. 9,330,509.

(51) Int. Cl.
*G07C 5/08* (2006.01)
*B60K 35/00* (2006.01)
*G07C 5/00* (2006.01)
*H04W 4/12* (2009.01)

(52) U.S. Cl.
CPC ............. *G07C 5/008* (2013.01); *B60K 35/00* (2013.01); *G07C 5/085* (2013.01); *G07C 5/0808* (2013.01); *G07C 5/0825* (2013.01); *G07C 5/0841* (2013.01); *H04W 4/12* (2013.01); *B60K 2350/102* (2013.01); *B60K 2350/1024* (2013.01); *B60K 2350/1028* (2013.01); *B60K 2350/1044* (2013.01); *B60K 2350/1052* (2013.01)

(58) Field of Classification Search
None
See application file for complete search history.

(56) References Cited

U.S. PATENT DOCUMENTS

| | | | |
|---|---|---|---|
| 6,434,455 | B1 | 8/2002 | Snow et al. |
| 8,032,277 | B2 | 10/2011 | Larschan et al. |
| 9,330,509 | B2 | 5/2016 | Tamp |

(Continued)

FOREIGN PATENT DOCUMENTS

| | | |
|---|---|---|
| EP | 1037405 A2 | 9/2000 |
| EP | 1167924 B1 | 10/2012 |

OTHER PUBLICATIONS

Prosecution History from U.S. Appl. No. 14/312,832, dated Sep. 23, 2015 through Jan. 6, 2016, 30 pp.

*Primary Examiner* — Mussa A Shaawat
*Assistant Examiner* — Abdhesh K Jha
(74) *Attorney, Agent, or Firm* — Shumaker & Sieffert, P.A.

(57) ABSTRACT

A feedback system for a motor vehicle infotainment system is disclosed in which information about the state of the motor vehicle, including the infotainment system, and the mobile device may be collected and sent to a remote server that is responsible for receiving and/or organizing such feedback. A user may initiate a feedback process by pressing a dedicated button, issuing a voice command, performing a specific gesture, or other input action. The feedback system may collect a variety of data and create a notice on the mobile device so that a user may submit feedback at a time during which the user will not be operating the motor vehicle.

20 Claims, 4 Drawing Sheets

(56) References Cited

U.S. PATENT DOCUMENTS

| | | |
|---|---|---|
| 2011/0034128 A1 | 2/2011 | Kirsch et al. |
| 2013/0304278 A1* | 11/2013 | Chen .................. G06F 17/00 701/2 |
| 2014/0028477 A1* | 1/2014 | Michalske ............ G08G 1/005 340/990 |
| 2014/0094992 A1* | 4/2014 | Lambert ............... G07C 5/008 701/1 |
| 2014/0136148 A1* | 5/2014 | Pai ..................... G06F 11/2294 702/186 |

* cited by examiner

US 10,068,390 B2

METHOD FOR OBTAINING PRODUCT FEEDBACK FROM DRIVERS IN A NON-DISTRACTING MANNER

BACKGROUND

During testing of an automotive infotainment system for errors or bugs, a tester (e.g., a user) may desire to report an error while driving the vehicle. The infotainment system may be integrated with the vehicle or operate in a projected mode in which a separate computing device drives display of content on the infotainment system's screen. The separate computing device may receive sensor data from the vehicle including data regarding the vehicle's performance and whether the vehicle has any buttons or knobs to interface with the infotainment system. Providing feedback for the infotainment system, the vehicle, and/or the separate computing device may be difficult while operating the vehicle.

BRIEF SUMMARY

According to an implementation, a touchscreen of a motor vehicle infotainment system may receive an input that initiates a feedback process. The infotainment system may be communicatively coupled to the mobile device. The feedback process may refer to a snapshot being stored. The snapshot may include data about the status of the motor vehicle, the mobile device, and/or the infotainment system. The mobile device may receive an indication that it has been disconnected from the infotainment system. A notification may be generated on the mobile device and displayed thereon.

In an implementation, a system is disclosed that includes a database and a processor connected thereto. The database may store a snapshot that includes data about the status of at least one of the motor vehicle, the infotainment system, and/or the mobile device. The processor may receive an indication of an input from the motor vehicle infotainment system that initiates a feedback process. The infotainment system may be communicatively coupled to the mobile device. The feedback process may include a snapshot being stored. The processor of the mobile device may receive an indication that it has been disconnected from the infotainment system. The processor may generate a notification on the mobile device and display the notification on the mobile device.

A system and method are disclosed in which a mobile device may collect data for one or more a motor vehicle to which the mobile device is connected and the mobile device. A first indication of an input may be received. Responsive to the first indication of the input, a snapshot may be generated that includes at least a portion of the data and indicates a status of at least one of a motor vehicle infotainment system and the mobile device. The mobile device may receive a second indication that it has been disconnected from the motor vehicle. Responsive to the second indication, a notification may be generated on the mobile device. The notification may include a third indication of the snapshot. The notification may be displayed or otherwise presented on the mobile device.

In an implementation, a system according to the presently disclosed subject matter includes a means for collecting, by a mobile device, data for one or more of a motor vehicle to which the mobile device is connected and the mobile device. The system may include a means for receiving a first indication of an input and for generating a snapshot that includes at least a portion of the data. The snapshot may indicate a status of at least one of a motor vehicle infotainment system and the mobile device. The system may include a means for receiving a second indication that the mobile device has been disconnected from the motor vehicle. The system may include a means for generating a notification on the mobile device that includes a third indication of the snapshot. The system may include a means for displaying the notification on the mobile device.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
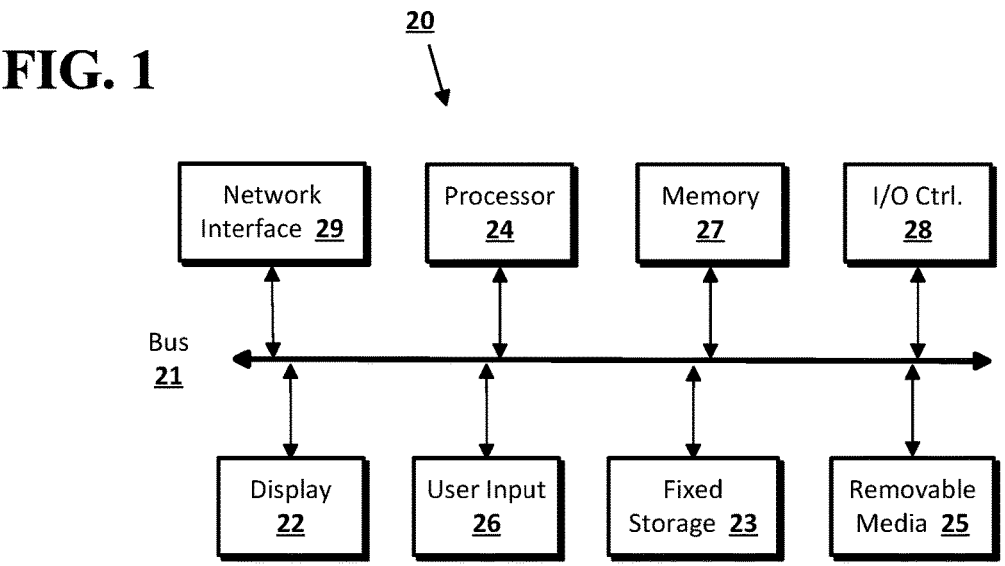
FIG. 1 shows a computer according to an implementation of the disclosed subject matter.

As disclosed herein, an automatic feedback system is provided that permits an operator of a motor vehicle to submit feedback on software utilized to display a motor vehicle infotainment system. Traditionally, motor vehicles utilize a computing system integrated into a head unit to provide or present the infotainment screen to the driver and/or passengers of the motor vehicle. For example, the infotainment system may provide navigation, music playback (e.g., via a radio or through a connection with a mobile device), vehicle settings or information (e.g., air conditioning controls, maintenance schedule, trip information), etc.

Implementations disclosed herein may be utilized with a projected architecture in which a mobile device connected to a display in the motor vehicle (e.g., the display may be integrated with the dashboard of the vehicle) may be utilized to drive the display. The mobile device, upon being communicatively coupled to the vehicle, may cause the vehicle's display and speakers/audio system to operate as or have the functionality of a traditional infotainment system. For example, the mobile device may handle the processing necessary to display a navigation interface on the motor vehicle's display. The mobile device may be notified about the interface capabilities of the vehicle's infotainment system. For example, some vehicles have buttons and/or knobs that can be utilized to navigate the menus, enter text, initiate and/or respond to voice interaction, etc. The mobile device may receive a signal indicating the interface capability of the infotainment system (e.g., touchscreen, one or more buttons, one or more rotating knobs, etc.). The mobile device may receive a signal when a user interacts with the infotainment system utilizing one of the aforementioned interface methods.

Entering a bug report or providing other feedback on the infotainment system's operation may be difficult during operation of the motor vehicle. In particular, finding and selecting a particular button on the mobile device and/or infotainment system to initiate and send feedback for a particular feature of the infotainment system may be distracting and unwanted. Further, the feedback provided while driving may be abbreviated because the driver is more focused on operating the vehicle. Voice feedback can also be difficult to receive over the background noise of a moving vehicle and it still requires transcription. This becomes computationally undesirable due to the volume of feedback from various users of a vehicle infotainment system.

As disclosed herein, a user may input a command into an infotainment system (e.g., perform a gesture, issue a voice command, or press a dedicated button) to initiate a feedback process. The process may include collecting, for example, system logs for the mobile device, GPS data, a screenshot or video of what was displayed on the screen immediately before or at the time of the input was given (e.g., the gesture being performed or key being pressed). When the user disconnects the mobile device from the vehicle, a notification may be provided on the mobile device. The mobile device may, upon the notice being selected, display an image captured at the time the feedback process was initiated and enable to the user to provide comments to be associated with the image. The snapshot data, including the image, and the user's comments may be transmitted to a remote server that is responsible for collecting bug reports or feedback from users.

Figure 3:
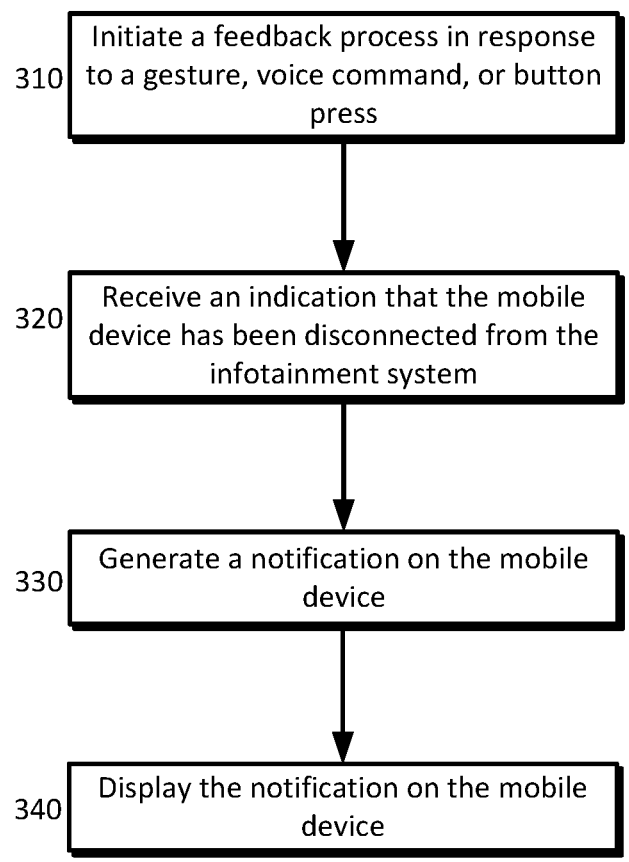
FIG. 3 is an example of a process of a user-initiated feedback process that causes a notification to be generated and presented to the user on a mobile device, thereby allowing the user to enter feedback about the system while the user is not operating a motor vehicle as disclosed herein.

In an implementation, an example of which is provided in FIG. 3, a user may initiate a feedback process at 310. An infotainment system may receive an input that initiates a feedback process. A mobile device connected to the vehicle's infotainment system, whether it is a traditional system or a projected architecture system described above, may receive an indication that the feedback process has been initiated. The system may cause the motor vehicle's speaker to emit an audible tone, mobile device to vibrate, to indicate that the feedback process has been received or that the input was received. For example, the gesture required to initiate the feedback process may require a user to contact the screen nearly simultaneously at three points of a touchscreen of the infotainment system. Once the system detects such a gesture, it may notify the user that the system has initiated the feedback process by emitting a tone through the vehicle's speakers and/or the mobile device. A visual response may be provided to indicate that the feedback process has been initiated. For example, the infotainment system's display may show a text message indicating the feedback process has been initiated. In some configurations, the input to initiate the feedback process may be received by the mobile device. For example, a gesture may be performed on the touchscreen of the mobile device.

The mobile device may be connected to the motor vehicle in a wired (e.g., USB) or wireless manner (e.g., Bluetooth). The device may store a variety of data such as system logs for the device's operation (e.g., the operating system or software running on the device), the user's interaction with the infotainment system (e.g., touches, button presses, voice commands, etc.), and/or data regarding the motor vehicle's operation such as location, speed, vehicle settings (e.g., air conditioning settings, speaker volume, trip information, etc.) or the like.

During normal operation, the mobile device may receive signals from the vehicle such as the infotainment system status and/or vehicle status. Similarly, the mobile device may store data regarding its own operation and the software executed thereon. The system may also store one or more images of the infotainment display. The data may be associated with a time reference. In order to save space, the data may be compressed and/or older data may be overwritten as new data is received. For example, if the system is configured to store five minutes' worth of data, it may overwrite the oldest data with current data. In some configurations, the motor vehicle may store data regarding its operation and/or the infotainment system on computer readable memory integrated with the vehicle. It may transmit the data periodically or in response to a request received by the mobile device (e.g., the feedback process being initiated). As described earlier, the data may include, for example, a sensor log of the motor vehicle, a GPS location, a date, a time, an image of the infotainment system, a video of the infotainment system, a log of the infotainment system, and a mobile device log.

The mobile device may store a snapshot of the data upon the feedback process being initiated. The snapshot may be generated by the mobile device. It may contain one or more images of what was displayed on the vehicles display at or thereabout the time of the feedback process being initiated. The snapshot may include the data collected by the system during normal operation or otherwise accumulated by the system for a period of time preceding and including the feedback process being initiated. In configurations in which the motor vehicle stores information on computer readable memory integrated with the vehicle, the mobile device may request any data stored thereon from the vehicle. The snapshot may be stored until it is explicitly deleted from the mobile device's memory and/or transmitted to a remote server that collects such feedback.

The mobile device may receive an indication that it has been disconnected from the infotainment system or the motor vehicle at 320. For example, a user may unplug a USB cable that connected the mobile device to the motor vehicle. Similarly, a user may stop a wireless communication protocol that connects the mobile device with the motor vehicle. A notification may be generated on the mobile device at 330. The notification may be generated subsequent to receiving the indication that the mobile device has been disconnected from the vehicle. It may be generated after the snapshot is stored and before the disconnect signal is received. The notification may contain at least a portion of the information collected in the snapshot or a representation thereof. For example, the notification may indicate a date and time at which the snapshot was collected or a screen capture of the infotainment display. The notification may be displayed or otherwise presented on the mobile device at 340. The notification may serve as a reminder to the user that the user indicated a desire to leave feedback on a feature of the infotainment system and/or the mobile device's interface therewith. The notification, for example, may include a picture of what was shown on the vehicle's infotainment display at the or near the time the feedback process was initiated. It may include information about the time and location. The notification may be stored in a system tray on the mobile device or presented as an email, text, or the like. The notification, upon being selected by a user, may show a more complete representation or all of the snapshot data.

As an example, a user may notice that a user interface element, such as a menu or a software button, appears incorrect compared to another user interface element that is similar or identical. The system may collect logs regarding the state of the software services on the mobile device, state of the power usage, memory usage information, etc. The user may perform a gesture to initiate the feedback process. As another example of an error for which a user may desire to provide feedback is if the mobile device was providing a navigation interface to the infotainment system of the vehicle and it provided an incorrect instruction. The system may store a snapshot that includes the navigation map displayed to the user in the car at the time the incorrect instruction was provided, GPS coordinates of the location, and other system logs. The notification may include the picture associated with the snapshot.

A user may select the notification. The system may display a portion of the snapshot data such as the image captured when the feedback process was initiated. For example, the notification may be sent to the user as a text message or appear as an application notification. A hyperlink may be contained in the text message that launches a web page into which the user may provide feedback or selection of the notification may trigger the launch of an application specific to providing feedback. The user may enter a comment regarding the snapshot or portion thereof such as the system's user interface was incorrect or provided incorrect navigation instructions. The user's comment may be transmitted at the same time as the snapshot or separately. The snapshot and comment may be transmitted to a remote server that collects feedback on the infotainment system.

Figure 4:
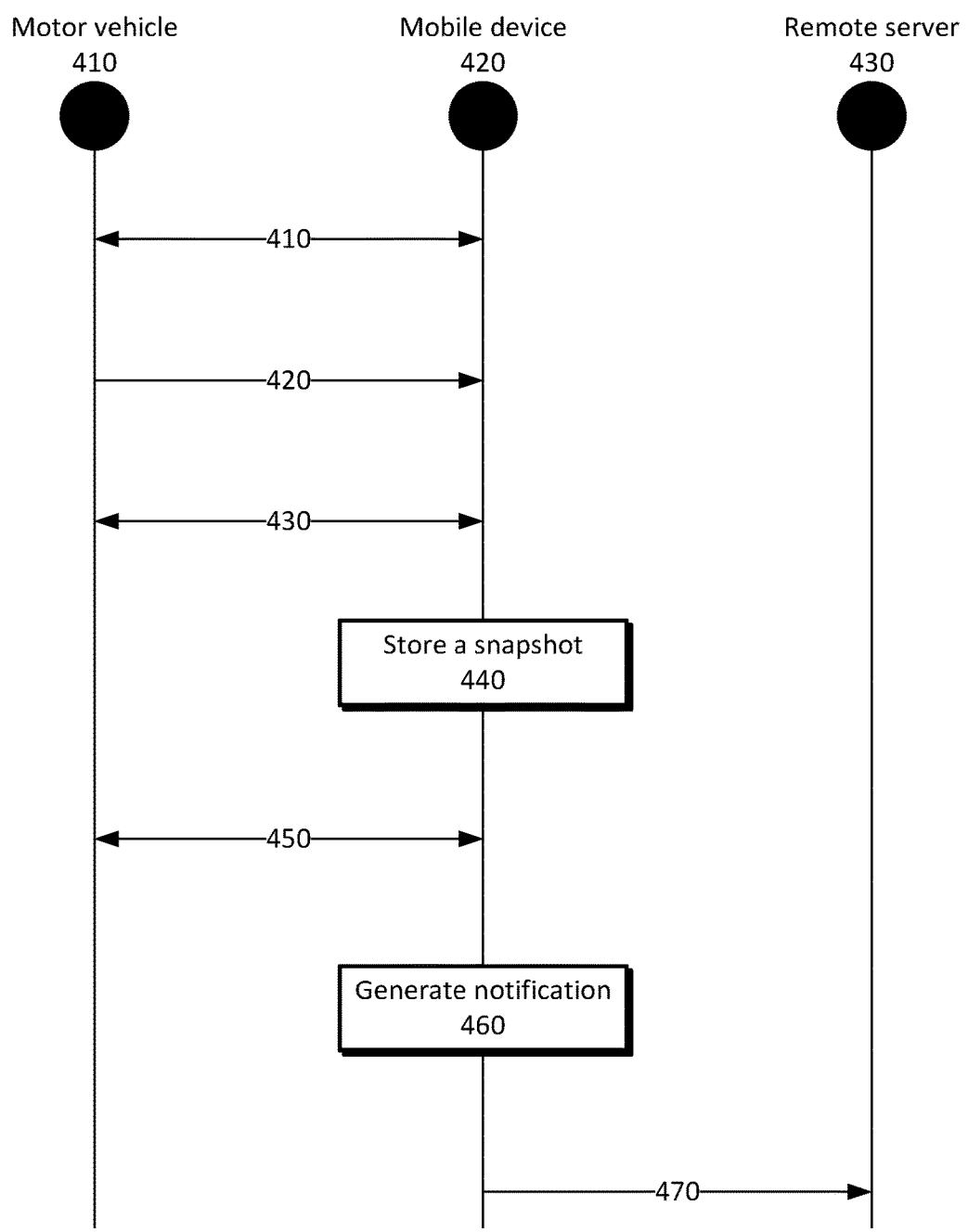
FIG. 4 is an example system that for generating a notification about a feature of an infotainment system for which the user would like to provide feedback as disclosed herein.

In an implementation, an example of which is provided in FIG. 4, a system is disclosed that includes a processor and a database connected thereto. The database may refer to a computer readable memory associated with a mobile device 420 and it may store one or more snapshots that include data about the status of one or more of a motor vehicle 410 and/or its infotainment system and the mobile device 420 itself as described earlier. For example, the database (e.g., computer readable memory) may store file system data and read and/or write data to the file system. The mobile device 420 may be connected to the motor vehicle 410 (e.g., by USB or Bluetooth) and send and/or receive signals related to the infotainment system at 410.

The processor may be configured to receive an indication of an input (e.g., a gesture, voice command, key press) from an infotainment system or a button press indicating the user's desire to initiate a feedback process at 420. The feedback process may cause the storage of a snapshot to the database at 440. In some configurations, the mobile device 420 may request and receive data from the motor vehicle 410 at 430. In a projected architecture, the infotainment may send any data, such as button presses or screen touches, to the mobile device 420 at 430 automatically and/or constantly upon the mobile device 420 being connected to the motor vehicle 410. The mobile device 420 may receive an indication that it has been disconnected from the infotainment system at 450 as described above and it may generate a notification at 460. The notification may be displayed to the user of the mobile device. The snapshot may be sent to a remote server 430 that is responsible for collecting feedback on the infotainment system and/or mobile devices interaction therewith at 470.

Figure 5:
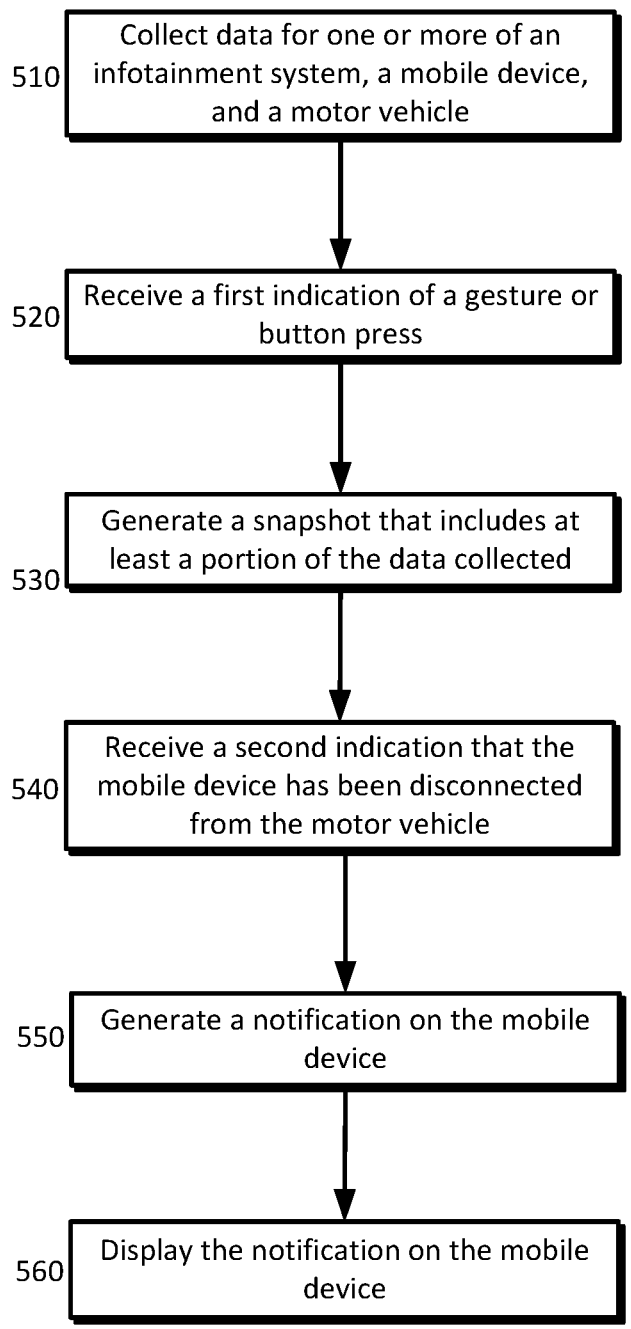
FIG. 5 shows an example in which a mobile device may collect data for one or more of a motor vehicle to which it is connected, an infotainment system, and the mobile device itself and the mobile device may generate a snapshot and notification thereof as disclosed herein.

An example process is shown in FIG. 5 in which the mobile device may collect data for the motor vehicle to which it is connected and the mobile device itself at 510 as described earlier. A first indication of an input may be received by the mobile device at 520. The input may be a specific gesture, for example, as described above that initiates a feedback process. Responsive to the first indication of the input (e.g., a gesture, a voice command, a key press), the mobile device may generate a snapshot that includes at least a portion of the data collected at 530. For example, the snapshot may include the status of infotainment system and/or the mobile device at and/or before the time the first indication was received. The mobile device may receive a second indication that it has been disconnected from the motor vehicle at 540. The mobile device may generate a notification in response to the first indication or the second indication at 550. The notification may include a third indication of the snapshot. For example, the snapshot may include a complete log of the mobile device's processes and the infotainment system's activity. The third indication may be a picture of what was displayed on the infotainment system's display and/or a time reference of when feedback process was initiated. The notification may be displayed on the mobile device at 560.

In operation, the mobile device may receive an indication that it is connected to the motor vehicle. A user may desire not to operate the mobile device in a feedback mode. In such a case, the system may ignore an input to initiate the feedback process. If, however, the user activates the feedback mode, the mobile device may receive a request to initiate a data collection policy. The data collection policy may refer to the type of data that is collected, the periodicity with which data are collected, the amount of data to store before overwriting it with new data, etc. For example, a user may desire to exclude the system from storing images of the infotainment system's display except when the user performs a gesture to initiate the feedback process. The system may collect the data from the vehicle and/or mobile device according to the data collection policy specified.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
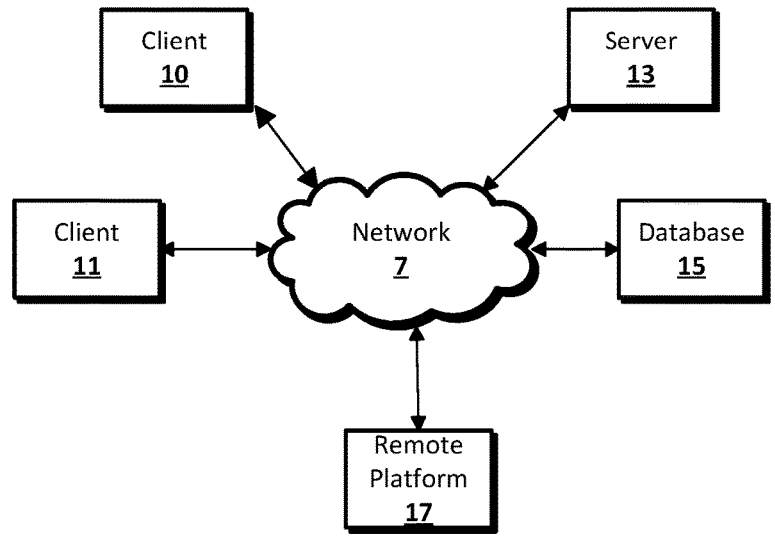
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
  receiving, by a mobile device connected to a vehicle infotainment system, a first request from a user to initiate a feedback process, the infotainment system and the mobile device comprising a projected architecture that displays, on the infotainment system, at least a portion of an application provided by the mobile device;

in response to the first request, storing, by the mobile device, at least a portion of content presented by the vehicle infotainment system as stored content;

determining, by the mobile device, that the mobile device has been disconnected from the vehicle infotainment system;

in response to determining that the mobile device has been disconnected from the vehicle infotainment system, outputting, by the mobile device to the user, a notification indicating an aspect of the stored content;

receiving, by the mobile device, a second request from the user to present the stored content to the user;

in response to the second request, presenting, by the mobile device, at least a portion of the stored content to the user;

receiving, by the mobile device, feedback about the content from the user; and transmitting, by the mobile device to a server remote from the mobile device, the feedback about the content.

2. The method of claim 1, further comprising:
providing, by the mobile device, the content to the vehicle infotainment system for presentation by the vehicle infotainment system.

3. The method of claim 1, wherein the first request comprises at least one selected from the group consisting of: a gesture, a voice command, a dedicated button indication, and a touch screen indication.

4. The method of claim 1, further comprising:
in response to receiving the first request, providing, by the mobile device, an indicator of initiation of the feedback process.

5. The method of claim 1, further comprising:
in response to receiving the first request, providing, by the mobile device, at least one selected from the group consisting of: an instruction for a speaker of a motor vehicle to emit an audible tone, an instruction for a display screen of a motor vehicle to display a visual indicator, an audible tone from a speaker of the mobile device, a visual indicator on a display screen of the mobile device, and a vibration from the mobile device.

6. The method of claim 1, wherein the content comprises at least one selected from the group consisting of: a video, an image, and audio.

7. The method of claim 1, wherein:
the content comprises at least one selected from the group consisting of: an image from an application executing on the mobile device, a video from an application executing on the mobile device, audio from an application executing on the mobile device, an image of status data of a motor vehicle connected to the vehicle infotainment system, and an image of status data of the mobile device.

8. The method of claim 1, wherein the feedback comprises a comment by the user about the content.

9. The method of claim 1, further comprising:
generating, by the mobile device, a snapshot comprising the stored content, wherein the feedback comprises a comment by the user about the content and the snapshot.

10. The method of claim 1, wherein the vehicle infotainment system is connected to a motor vehicle, the method further comprising:
in response to the first request, storing by the mobile device, status data comprising at least one selected from the group consisting of: data from the motor vehicle and a data from the mobile device; and generating, by the mobile device, a snapshot comprising the status data and the stored content, wherein the feedback comprises a comment by the user about the content and the snapshot.

11. The method of claim 1, wherein the vehicle infotainment system is connected to a motor vehicle, the method further comprising:
in response to the first request, storing by the mobile device, status data from the motor vehicle, the status data comprising at least one selected from the group consisting of:
sensor data from a sensor component of the motor vehicle, a log from a sensor component of the motor vehicle, an indicator of a vehicle setting of the motor vehicle, an indicator of an interface component of the vehicle infotainment system, an indicator of the user's interaction with the vehicle infotainment system, a log of the vehicle infotainment system, an indicator of operation of the vehicle infotainment system, an indicator of execution of software operating on the vehicle infotainment system, a date, and a time.

12. The method of claim 1, further comprising:
in response to the first request, storing by the mobile device, status data from the mobile device, the status data comprising at least one selected from the group consisting of:
an indicator of operation of the mobile device, an indicator of execution of software operating on the mobile device, a log of the mobile device, an indicator of the user's interaction with the mobile device, a date, and a time.

13. The method of claim 1, wherein:
the vehicle infotainment system comprises a display screen of a motor vehicle; and
the display screen is integrated into a dashboard of the motor vehicle.

14. The method of claim 1, wherein:
the vehicle infotainment system comprises a display screen of a motor vehicle; and
the display screen is separate and distinct from a dashboard of the motor vehicle.

15. The method of claim 1, further comprising:
providing, by an application executing on the mobile device, the content to the vehicle infotainment system for presentation by the vehicle infotainment system, wherein:
the content comprises a video,
the presentation by the vehicle infotainment system comprises displaying the video on a display screen of the vehicle infotainment system,
the presentation by the mobile device comprises displaying at least one image of the video on a display screen of the mobile device, and
the feedback comprises a comment by the user about the video.

16. A non-transitory, computer-readable medium storing instructions that, when executed by a processor, cause the processor to perform operations comprising:
in response to a first request from a user to initiate a feedback process, storing, by a mobile device, at least a portion of content presented by a vehicle infotainment system as stored content;

determining, by the mobile device, that the mobile device has been disconnected from the vehicle infotainment system;

in response to determining that the mobile device has been disconnected from the vehicle infotainment system, outputting, by the mobile device to the user, a notification indicating an aspect of the stored content;
receiving, by the mobile device, a second request from the user to present the stored content to the user;
in response to the second request, presenting, by the mobile device, at least a portion of the stored content to the user;
receiving, by the mobile device, feedback about the content from the user; and
transmitting, by the mobile device to a server remote from the mobile device, the feedback about the content,
wherein the infotainment system and the mobile device comprise a projected architecture that displays, on the infotainment system, at least a portion of an application provided by the mobile device.

17. The non-transitory, computer-readable medium of claim 16, wherein the operations further comprise:
providing, by the mobile device, the content to the vehicle infotainment system for presentation by the vehicle infotainment system.

18. The non-transitory, computer-readable medium of claim 16, wherein the operations further comprise:
providing, by an application executing on the mobile device, the content to the vehicle infotainment system for presentation by the vehicle infotainment system, wherein:
the content comprises a video,
the presentation by the vehicle infotainment system comprises displaying the video on a display screen of the vehicle infotainment system,
the presentation by the mobile device comprises displaying at least one image of the video on a display screen of the mobile device, and
the feedback comprises a comment by the user about the video.

19. The non-transitory, computer-readable medium of claim 16, wherein the operations further comprise:
in response to the first request, storing by the mobile device, status data comprising at least one selected from the group consisting of: data from the motor vehicle and a data from the mobile device; and
generating, by the mobile device, a snapshot comprising the status data and the stored content, wherein the feedback comprises a comment by the user about the content and the snapshot.

20. A system comprising:
a processor; and
a non-transitory, computer-readable medium in communication with the processor and storing instructions that, when executed by the processor, cause the processor to perform operations comprising:
in response to a first request from a user to initiate a feedback process, storing, by a mobile device, at least a portion of content presented by a vehicle infotainment system as stored content;
determining, by the mobile device, that the mobile device has been disconnected from the vehicle infotainment system;
in response to determining that the mobile device has been disconnected from the vehicle infotainment system, outputting, by the mobile device to the user, a notification indicating an aspect of the stored content;
receiving, by the mobile device, a second request from the user to present the stored content to the user;
in response to the second request, presenting, by the mobile device, at least a portion of the stored content to the user;
receiving, by the mobile device, feedback about the content from the user; and
transmitting, by the mobile device to a server remote from the mobile device, the feedback about the content,
wherein the infotainment system and the mobile device comprise a projected architecture that displays, on the infotainment system, at least a portion of an application provided by the mobile device.

* * * * *